United States Patent [19]
Loeb et al.

[11] Patent Number: 5,157,530
[45] Date of Patent: Oct. 20, 1992

[54] OPTICAL FIBER SYSTEM

[75] Inventors: Mitchell L. Loeb, Durham; George R. Stilwell, Jr., Raleigh, both of N.C.

[73] Assignee: International Business Machines Corporation, Armonk, N.Y.

[21] Appl. No.: 467,091

[22] Filed: Jan. 18, 1990

[51] Int. Cl.$^5$ .................... H04J 14/02; G06K 5/04
[52] U.S. Cl. ........................................ 359/124; 371/1
[58] Field of Search ............... 455/600, 612, 617; 370/1, 3, 4; 350/96.16; 359/124; 371/1; 328/55; 307/602

[56] References Cited

U.S. PATENT DOCUMENTS

| | | | |
|---|---|---|---|
| 3,792,436 | 2/1974 | DeVoy et al. | 371/1 |
| 4,677,618 | 6/1987 | Haas et al. | 359/124 |
| 4,829,596 | 5/1989 | Barina | 370/3 |
| 4,905,218 | 2/1990 | Takeuchi et al. | 370/3 |

OTHER PUBLICATIONS

IBM Technical Disclosure Bulletin, vol. 10, No. 1, Jun. 1967, Giudi, A. M., pp. 37–39.
L. B. Jeunhomme, 'Single Mode Fiber Optics, Principles & Applications' 1983, pp. 112–114.
Journal of Lightwave Technology, vol. 8, No. 2, Feb. 1990, pp. 239–242.

*Primary Examiner*—Edward L. Coles, Sr.
*Assistant Examiner*—Kinfe-Michael Negash
*Attorney, Agent, or Firm*—Joscelyn G. Cockburn

[57] ABSTRACT

Described are a technique and an apparatus for deskewing data transmitted via a dispersive medium such as a fiber optic link. The relative delays in arrival time for a plurality of bits, propagated in separate channels are measured. The relative delays are used to calculate the wavelength ($\lambda$) of one channel and the zero dispersion wavelength ($\lambda_0$) of the medium. The relative delays in arrival times for the remaining bits in a group of bits are predicted using the measured relative delays, the spacing ($\delta$) between the transmitters and the calculated wavelengths. An adjustable delay for storing data bits is provided in each channel. The relative delays are used to deskew the individual bits.

13 Claims, 5 Drawing Sheets

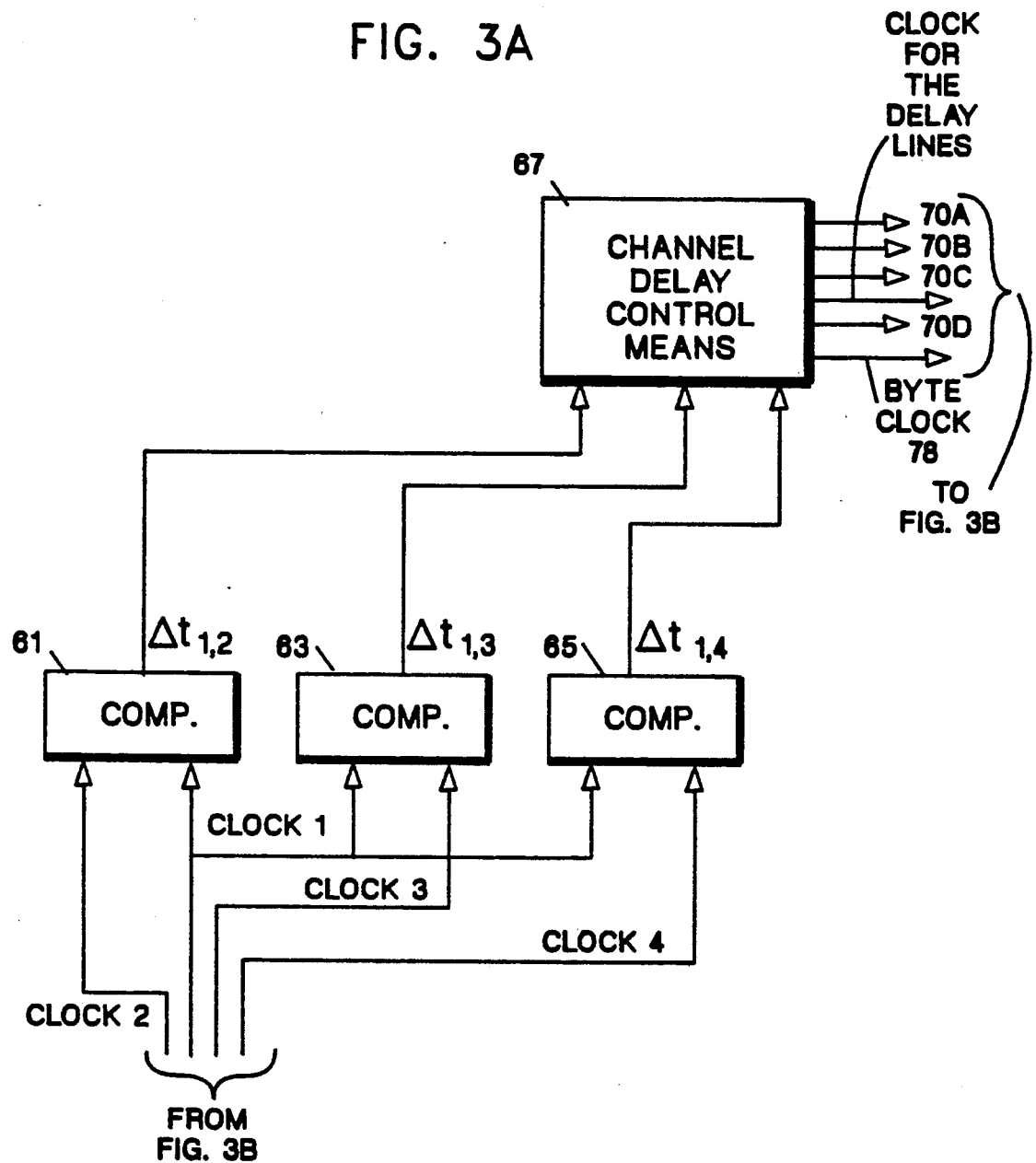

OPTICAL FIBER SYSTEM

BACKGROUND OF THE INVENTION

1. Field of the Invention

The present invention relates to data communications in general and more particularly to a method and an apparatus for deskewing wavelength division multiplexed data which is transmitted through a dispersive medium.

2. Prior Art

The proliferation of computers and other data handling devices have created a need for more effective and efficient communications systems for interconnecting the computers and/or other data handling devices. The wavelength division multiplexing (WDM) system has been used to interconnect computers and other data handling devices. The WDM communications systems are attractive in that they can provide parallel data transmission on a single transmission link such as a single wire and/or single optical fiber.

In a conventional optical WDM communications system, the individual bits of a group of bits, e.g., a byte, are applied to different encoders in a set of optical encoders. The encoders modulate each bit or channel at a different optical frequency or wavelength. The modulated optical signals are merged into a single beam which is transmitted through a single fiber to a receiving location. At the receiving location, the single beam is separated into its bit signal components to re-establish the originally transmitted byte of data. Optical filters and/or gratings are used to separate the beam into its component parts.

One known problem in using WDM in an optical fiber system is that the respective bits of a byte of data arrive at different times at the receiver. This phenomenon is referred to as bit skew. A probable reason for bit skew is that an optical fiber is a dispersive medium which tends to delay optical signals at different rates. Thus, optical signals at some frequencies are delayed more than optical signals at other frequencies. Since a byte of WDM data contains signals with different frequencies or wavelengths, the effect of dispersion is to delay some bits in the byte more than others.

For relatively low transmission rate and/or relatively short length of transmission link, the amount of bit skew may fall within acceptable limits. However, for relatively high transmission rate and/or long transmission links, the bit skew may become so large that bits in one byte may at least partially overlap with bits in another byte.

Even for relatively long transmission links, if the exact length of the transmission link is known, the retardation or delay of a bit transmitted at a particular wavelength can be readily calculated. However, the exact length of transmission links in practical commercial communications systems is influenced by several conditions and as such is not normally known. For example, the exact length of a transmission link depends on the manner in which it is installed and will vary from one installation to the next, depending on the installer's technique. Even if the exact length is known initially, it can change due to changes in temperature or it may change if connectors and/or sections of the fiber must be replaced after installation.

Furthermore, it is believed that the bit skew problem is aggravated by drifts in the wavelengths of the lasers which generate the light beams and/or shifts in the group delay curves.

The prior art has proposed several techniques for solving the bit skew problem. Among the proposed techniques, perhaps the best technique is the one set forth in U.S. Pat. No. 4,677,618. In the subject patent, the time delays between two different wavelength (sub-channels) are measured. The measured time delays and known information about the fiber are used in an algorithm which predicts the arrival time of bits in the other sub-channels. The prediction scheme requires that the central wavelengths of the transmitting lasers and the fiber group delay curve must be stable. Any unexpected drift of the laser wavelengths or a shift of the fiber group delay may cause the predicted arrival times to be incorrect. As a result, the sampling time would not be at the bit center and the probability of errors would increase.

SUMMARY OF THE INVENTION

It is a general object of the invention to provide a more efficient communications system for transmitting information between communicating units.

It is a more specific object to provide a communications system in which bit skew caused by drifts in the laser wavelengths and/or shifts in the group delay curve and/or changes in the fiber lengths are corrected.

It is still another object of the present invention to provide a communications system in which bit skew is corrected without any prior knowledge of the fiber characteristics.

The above and other objects are achieved by measuring the relative delays between a plurality of bits in parallel channels at a receiving location. The wavelengths ($\lambda$) for at least one of the channels and the zero dispersion wavelength of the fiber ($\lambda_0$) are determined from these measurements. These wavelengths, relative delays and the wavelength spacing ($\delta$) between the light emitting devices which transmit the bits are used to predict the relative delays for the other bits in the group. The relative delays are used to control adjustable delay devices located in each channel so that the bits for the transmitted group or byte are properly (linearly) aligned in time.

In particular, the skew alignment process includes the steps of:

A. Measuring the time delays between the bit clocks in the first four sub-channels, $\Delta t_{1,2}$, $\Delta t_{1,3}$ and $\Delta t_{1,4}$.

B. Calculating $\lambda_1$ from the quadratic equation below $$\lambda_1 = \frac{-b \pm \sqrt{b^2 - 4ac}}{2a}$$

where
$a = 2(3\Delta t_{1,3} - \Delta t_{1,4} - 3\Delta t_{1,2})$
$b = 4\delta(-4\Delta t_{1,3} + \Delta t_{1,4} + 5\Delta t_{1,2})$
$c = \delta^2(39\Delta t_{1,3} - 7\Delta t_{1,4} - 57\Delta t_{1,2})$ The positive square root corresponds to wavelengths greater than $\lambda_0$, and the negative square root corresponds to wavelengths smaller than $\lambda_0$. $\delta$ is the wavelength spacing between the subchannels.

C. Calculating $\lambda_0$ from the equation below.

$$\lambda_0 = \frac{\delta\left(\frac{\Delta t_{1,3}}{\Delta t_{1,2}} - 2\right)}{\frac{\Delta t_{1,3}}{\Delta t_{1,2}} \ln\left(1 + \frac{\delta}{\lambda_1}\right) - \ln\left(1 + \frac{2\delta}{\lambda_1}\right)}$$

D. Calculating the delay times for the other bits from the equation below using the measured $\Delta t_{1,2}$, the channel number, m, and the channel spacing, $\delta$.

$$\Delta t_{1,m} = \Delta t_{1,2} \frac{(m-1)\delta - \lambda_0 \ln\left(1 + \frac{(m-1)\delta}{\lambda_1}\right)}{\delta - \lambda_0 \ln\left(1 + \frac{\delta}{\lambda_1}\right)}$$

E. Setting the adjustable delay in each channel an amount equal to its corresponding measured or calculated delay.

The foregoing features and advantages of the invention will be more fully described in the accompanying drawings.

DETAILED DESCRIPTION OF THE PREFERRED EMBODIMENT

Figure 1:
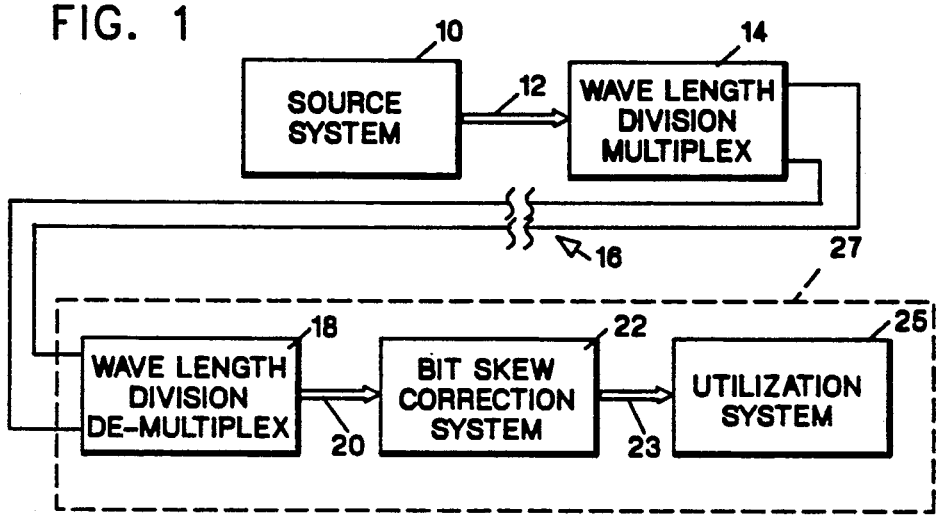
FIG. 1 is a functional block diagram of a system within which the present invention is practiced.

FIG. 1 shows a functional block diagram of a system embodying the teachings of the present invention. The system includes a source system 10 which can be any kind of digital processing system or device capable of providing digital data which is transmitted on parallel bus 12 to a wavelength division multiplexing circuit 14. For example, bus 12 is 8-bit-wide (eight data channels). However, busses of any widths can be used. The only limitation is that a wavelength division multiplexing circuit must be capable of handling or processing all data channels in the selected bus. The function of the wavelength division multiplexing circuit 14 is to encode each bit optically, combine them into an optical bit stream with a single multi-wavelength signal which is transmitted through medium 16 (such as an optical fiber) with frequency-related dispersion characteristics. The signal is received by the wavelength division demultiplexing circuit 18 which separates the multi-wavelength signal into parallel signals onto bus 20. Each of the signals on bus 20 has different wavelengths. The bit signals on bus 20 are transmitted to bit skew correction system 22. As will be described in detail hereinafter, the function of the bit skew correction system 22 is to deskew (that is, align) the bits from bus 20 into a parallel data stream which are transmitted over bus 23 to utilization system 25.

Figure 2:
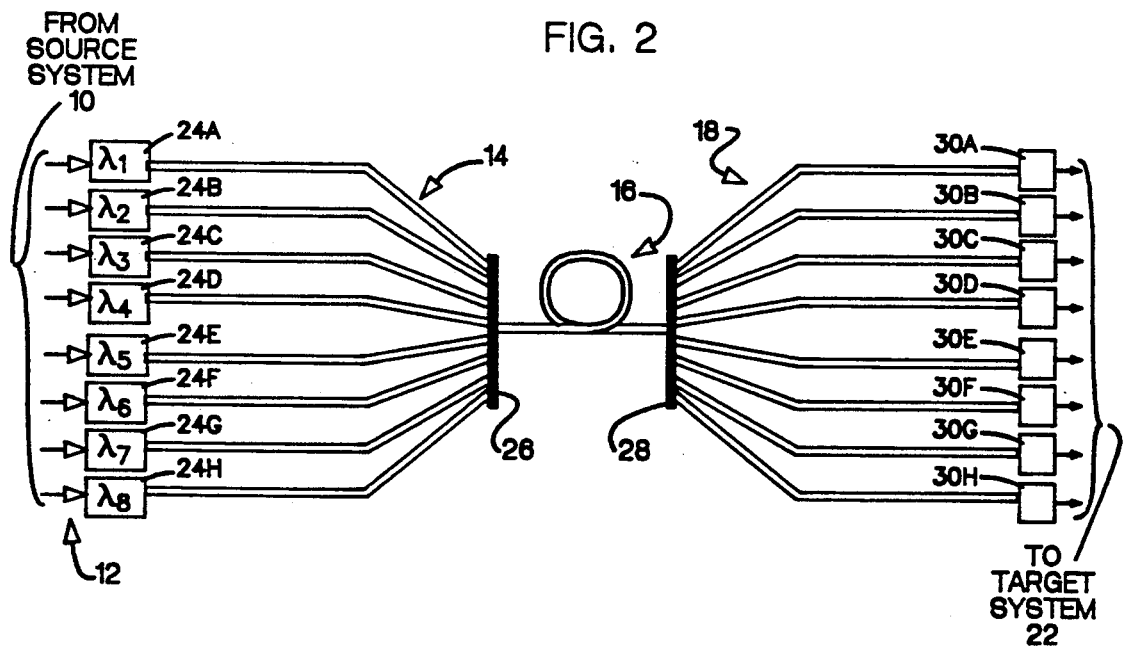
FIG. 2 is a detailed diagram of the wavelength division multiplexing and demultiplexing sections of the system shown in FIG. 1.

FIG. 2 shows details of the wavelength division multiplexing circuit 14 and wavelength division demultiplexing circuit 18. The bit stream in each channel of parallel bus 12 is used to modulate optical devices 24A through 24H. Each of the optical devices generates an optical signal at a predetermined optical frequency or wavelength. The optical signals are transmitted by optical fibers 36A through 36H to optical combiner 26. The optical combiner 26 combines or merges the individual optical signals to form a composite (multi-wavelength) signal which is transmitted through optical fiber 16 to an optical grating 28 at a receiving system 27. The optical grating 28 separates the received signal into its components and sends each of the components to separate optical detectors 30A through 30H. The electrical bit signals produced by the optical detectors 30A through 30H are aligned via the system to be described hereinafter and transmitted to the utilization system 25.

Still referring to FIG. 2, the optical devices 24A through 24H are conventional devices which can be obtained from several different manufacturers. The details of these devices will not be discussed any further. Suffice it to say that optical devices such as those described in U.S. Pat. No. 4,677,618 can be used in the embodiment of the present invention. The subject patent is incorporated herein by reference. In addition, the wavelength division multiplexer and the wavelength division demultiplexer are conventional devices such as those described in the referenced patent. It should also be noted that the functions performed by the optical combiner or multiplexer 26 and the optical grating or demodulator 28 can be performed using the same component with appropriate changes in beam direction.

Figure 4:
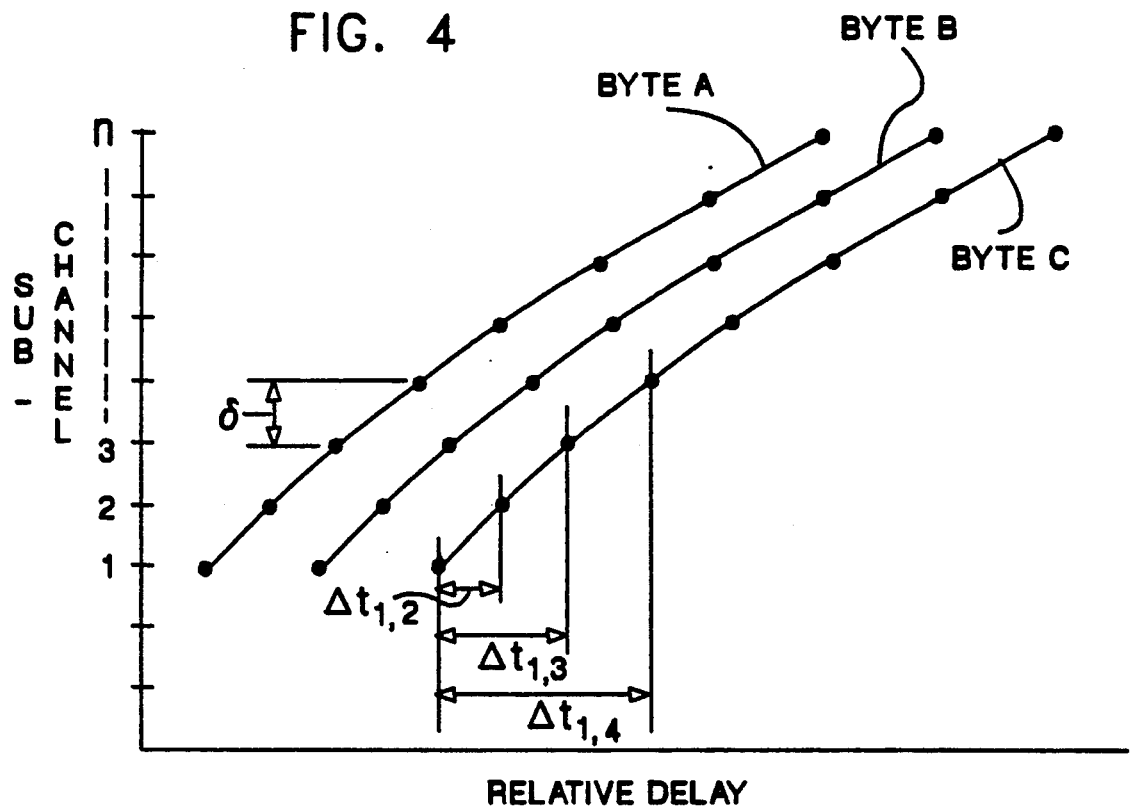
FIG. 4 is a graphic representation showing the effects of frequency-related dispersion in a dispersive medium.

FIG. 4 shows the arrival of three bytes of data at the receiver 27 (FIG. 2) for a system operating at its maximum link length for a particular bit error rate. The system would be designed to operate at the maximum length by choosing the minimum time between bytes to be limited by the dispersion in subchannel N since that subchannel has the most dispersion and, thus, the greatest intersymbol interference. This figure is also helpful in identifying the problem which the present invention solves. The problem is bit-skew caused by the variation of optical group velocity versus wavelength. As a result, even though the bits of a byte or any other grouping are transmitted simultaneously from a source system the constituent bits are skewed or shifted relative to one another.

Still referring to FIG. 4, the sub-channels at the receiver are plotted on the vertical coordinate while the relative delay are plotted on the horizontal axis of the graph. The symbol ($\delta$) represents the spacing between the optical signal generating devices 24A and 24B (FIG. 2) at the transmitter section of system. For purposes of the present invention, this spacing is assumed to be constant. Finally, $\Delta t$ represents the relative delay between bits in a particular byte. Thus, $\Delta t_{1,2}$ represents the delay between bits 1 and 2 of a byte. Similarly, $\Delta t_{1,3}$ represents the relative delay between bits 1 and 3 and so forth. As will be described subsequently, the relative delay between respective bits of a byte, the spacing $\delta$ between channels and other relevant characteristics of the group delay curve for each byte are used in correcting the skew associated with a particular byte of transmitted data.

As can be seen in FIG. 4, the bits (depicted by triangular symbols) for a particular byte such as byte A or byte B or byte C are arranged on a curve relative to each other. Even though the individual bits can be easily detected, it is very difficult to tell which bit goes with which byte. Ideally, each byte should be parallel with the vertical axis of the graph. If this were the case, then it would be simple to tell (that is, recover) the entire byte at the receiver. However, in the practical system, the bits of a particular byte are skewed relative to one another and the present invention makes the correction in the received data so that all the bits of a particular byte or group are aligned in a straight line.

Still referring to FIG. 4, the curves labeled Byte A, B and C may be characterized as group delay curves for (WDM) encoded bytes of data. If this characterization is adopted $\lambda$ (representing the wavelengths of transmitted signals) is plotted on the vertical axis of the graph while time (t) is plotted on the horizontal axis. A mathematical expression called fiber group delay equation can be written for the curve. The equation is then solved to generate other equations which are used in the below process (steps A through E) to align the bits in a particular byte. The process steps are:

A. Measuring the time delays between the bits clocks in the first four sub-channels, $\Delta t_{1,2}$, $\Delta t_{1,3}$ and $\Delta t_{1,4}$.

B. Calculating $\lambda_1$ from the quadratic equation below $$\lambda_1 = \frac{-b \pm \sqrt{b^2 - 4ac}}{2a}$$

where
$a = 2(3\Delta t_{1,3} - \Delta t_{1,4} - 3\Delta t_{1,2})$
$b = 4\delta(-4\Delta t_{1,3} + \Delta t_{1,4} + 5\Delta t_{1,2})$
$c = \delta^2(39\Delta t_{1,3} - 7\Delta t_{1,4} - 57\Delta t_{1,2})$ The positive square root corresponds to wavelengths greater than $\lambda_0$, and the negative square root corresponds to wavelengths smaller than $\lambda_0$. $\delta$ is the wavelength spacing between the sub-channels.

C. Calculating $\lambda_0$ from below.

$$\lambda_0 = \frac{\delta\left(\frac{\Delta t_{1,3}}{\Delta t_{1,2}} - 2\right)}{\frac{\Delta t_{1,3}}{\Delta t_{1,2}} \ln\left(1 + \frac{\delta}{\lambda_1}\right) - \ln\left(1 + \frac{2\delta}{\lambda_1}\right)}$$

D. Calculating the delay times for the other bits from the equation below using the measured $\Delta t_{1,2}$, the channel number, m, and the channel spacing, $\delta$.

$$\Delta t_{1,m} = \Delta t_{1,2} \frac{(m-1)\delta - \lambda_0 \ln\left(1 + \frac{(m-1)\delta}{\lambda_1}\right)}{\delta - \lambda_0 \ln\left(1 + \frac{\delta}{\lambda_1}\right)}$$

E. Setting the adjustable delay in each channel an amount equal to its corresponding measured or calculated delay.

The process is based on the group delay, $\tau$, found by integrating the dispersion equation given by Jeunhomme "Single Mode Fiber Optics, Principles and Applications", New York, Marcel Decker, 1983, p. 113.

The group delay, $\tau$, is $$\tau = \tau_0 + S_0\lambda_0\lambda - S_0\lambda_0^2 \ln\lambda \quad (1)$$

where $\tau_0$ is a constant, $\lambda_0$ is the zero-dispersion wavelength and $S_0$ is the value of the dispersion slope at $\lambda_0$. The delay between sub-channels 1 and m is $$\begin{aligned}
\Delta\tau_{1,m} &= \tau(\lambda_m - \tau(\lambda_1)) \\
&= S_0\lambda_0\lambda_m - S_0\lambda_0^2\ln\lambda_m - (S_0\lambda_0\lambda_1 - S_0\lambda_0^2\ln\lambda_1) \\
&= S_0\lambda_0(\lambda_m - \lambda_1) - S_0\lambda_0^2(\ln\lambda_m - \ln\lambda_1) \\
&= S_0\lambda_0(\lambda_m - \lambda_1) - S_0\lambda_0^2 \ln\frac{\lambda_m}{\lambda_1} \\
&= S_0\lambda_0(m-1)\delta - S_0\lambda_0^2 \ln\frac{\lambda_1 + (m-1)\delta}{\lambda_1}
\end{aligned} \quad (2)$$

where $\delta$ is the wavelength spacing between the sub-channels. Since $\Delta t = L\Delta\tau$, $$\frac{\Delta t_{1,m}}{\Delta t_{1,2}} = \frac{\Delta\tau_{1,m}}{\Delta\tau_{1,2}} = \frac{S_0\lambda_0(m-1)\delta - S_0\lambda_0^2\ln\left(1 + \frac{(m-1)\delta}{\lambda_1}\right)}{S_0\lambda_0\delta - S_0\lambda_0^2\ln\left(1 + \frac{\delta}{\lambda_1}\right)} \quad (3)$$

This removes the unknown, L, from the equations. Divide numerator and denominator by $S_0\lambda_0$.

$$\frac{\Delta t_{1,m}}{\Delta t_{1,2}} = \frac{(m-1)\delta - \lambda_0\ln\left(1 + \frac{(m-1)\delta}{\lambda_1}\right)}{\delta - \lambda_0\ln\left(1 + \frac{\delta}{\lambda_1}\right)} \quad (4)$$

Since there are still two unknowns, $\lambda_0$ and $\lambda_1$, we need two equations in order to solve for $\lambda_1$.

$$\frac{\Delta t_{1,3}}{\Delta t_{1,2}} = \frac{2\delta - \lambda_0\ln\left(1 + \frac{2\delta}{\lambda_1}\right)}{\delta - \lambda_0\ln\left(1 + \frac{\delta}{\lambda_1}\right)} \quad (5)$$

$$\frac{\Delta t_{1,4}}{\Delta t_{1,2}} = \frac{3\delta - \lambda_0\ln\left(1 + \frac{3\delta}{\lambda_1}\right)}{\delta - \lambda_0\ln\left(1 + \frac{\delta}{\lambda_1}\right)}$$

Let $P = \frac{\Delta t_{1,3}}{\Delta t_{1,2}}$ and let $Q = \frac{\Delta t_{1,4}}{\Delta t_{1,2}}$.

$$P = \frac{2\delta - \lambda_0\ln\left(1 + \frac{2\delta}{\lambda_1}\right)}{\delta - \lambda_0\ln\left(1 + \frac{\delta}{\lambda_1}\right)} \quad (6)$$

$$Q = \frac{3\delta - \lambda_0\ln\left(1 + \frac{3\delta}{\lambda_1}\right)}{\delta - \lambda_0\ln\left(1 + \frac{\delta}{\lambda_1}\right)}$$

Solve both equations for $\lambda_0$.

$$\lambda_0 = \frac{\delta(P-2)}{P\ln\left(1+\frac{\delta}{\lambda_1}\right) - \ln\left(1+\frac{2\delta}{\lambda_1}\right)} \quad (7)$$

$$\lambda_0 = \frac{\delta(Q-3)}{Q\ln\left(1+\frac{\delta}{\lambda_1}\right) - \ln\left(1+\frac{3\delta}{\lambda_1}\right)}$$

Combine these two equations:

$$\frac{\delta(P-2)}{P\ln\left(1+\frac{\delta}{\lambda_1}\right) - \ln\left(1+\frac{2\delta}{\lambda_1}\right)} = \quad (8)$$

$$\frac{\delta(Q-3)}{Q\ln\left(1+\frac{\delta}{\lambda_1}\right) - \ln\left(1+\frac{3\delta}{\lambda_1}\right)}$$

Cross multiply.

$$Q(P-2)\ln\left(1+\frac{\delta}{\lambda_1}\right) - (P-2)\ln\left(1+\frac{3\delta}{\lambda_1}\right) = \quad (9)$$

$$P(Q-3)\ln\left(1+\frac{\delta}{\lambda_1}\right) - (Q-3)\ln\left(1+\frac{2\delta}{\lambda_1}\right)$$

Combine similar logarithmic terms:

$$(3P-2Q)\ln\left(1+\frac{\delta}{\lambda_1}\right) + (Q-3)\ln\left(1+\frac{2\delta}{\lambda_1}\right) - \quad (10)$$

$$(P-2)\ln\left(1+\frac{3\delta}{\lambda_1}\right) = 0$$

The series expansion for $\ln(1+z)$ is $$\ln(1+z) = z - \frac{1}{2}z^2 + \frac{1}{3}z^3 - \ldots \quad (11)$$

if $|z| \leq 1$ and $z \neq -1$. These conditions will be true for all of our choices of $\lambda_1$ and $\delta$. Using a 4-term expansion:

$$(3P-2Q)\left(\frac{\delta}{\lambda_1} - \frac{1}{2}\frac{\delta^2}{\lambda_1^2} + \frac{1}{3}\frac{\delta^3}{\lambda_1^3} - \frac{1}{4}\frac{\delta^4}{\lambda_1^4}\right) + \quad (12)$$

$$(Q-3)\left(\frac{2\delta}{\lambda_1} - \frac{1}{2}\frac{4\delta^2}{\lambda_1^2} + \frac{1}{3}\frac{8\delta^3}{\lambda_1^3} - \frac{1}{4}\frac{16\delta^4}{\lambda_1^4}\right) -$$

$$(P-2)\left(\frac{3\delta}{\lambda_1} - \frac{1}{2}\frac{9\delta^2}{\lambda_1^2} + \frac{1}{3}\frac{27\delta^3}{\lambda_1^3} - \frac{1}{4}\frac{81\delta^4}{\lambda_1^4}\right) = 0$$

Multiply by $\frac{12\lambda_1^4}{\delta}$.

$$(3P-2Q)(12\lambda_1^3 - 6\delta\lambda_1^2 + 4\delta^2\lambda_1 - 3\delta^3) + \quad (13)$$

$$(Q-3)(24\lambda_1^3 - 24\delta\lambda_1^2 + 32\delta^2\lambda_1 - 48\delta^3) -$$

-continued
$$(P-2)(36\lambda_1^3 - 54\delta\lambda_1^2 + 108\delta^2\lambda_1 - 243\delta^3) = 0$$

Group terms by decreasing order of $\lambda_1$.

$$\lambda_1^3(36P-24Q+24Q-72-36P+72)+\lambda_1^2\delta(-18P$$
$$+12Q-24Q+72+54P31\ 108)$$
$$+\lambda_1\delta^2(12P-8Q+32Q-96-108P+216)+\delta^3(-$$
$$9P+6Q-48Q+144+243P+486)=0 \quad (14)$$

Since the coefficient of $\lambda_1^3$ is zero, (14) reduces to a quadratic equation in $\lambda_1$. Dividing by $\delta$, $$\lambda_1^2(36P-12Q-36)+\lambda_1\delta(-96P+24Q+120)+\delta^2(2-34P-42Q-342)=0 \quad (15)$$

Divide each term by 6:

$$2(3P-Q-3)\lambda_1^2+4\delta(-4P+Q+5)\lambda_1+\delta^2(39P-7Q-57)=0 \quad (16)$$

Replace P with $\Delta t_{1,3}/\Delta t_{1,2}$ and Q with $\Delta t_{1,4}/\Delta t_{1,2}$.

$$2(3\Delta t_{1,3}-\Delta t_{1,4}-3\Delta t_{1,2})\lambda_1^2+4\delta(-4\Delta t_{1,3}+\Delta t_{1,4}+5\Delta t_{1,2})\lambda_1+\delta^2(39\ \Delta t_{1,3}-7\Delta t_{1,4}-57\Delta t_{1,2})=0 \quad (17)$$

Figure 3B:
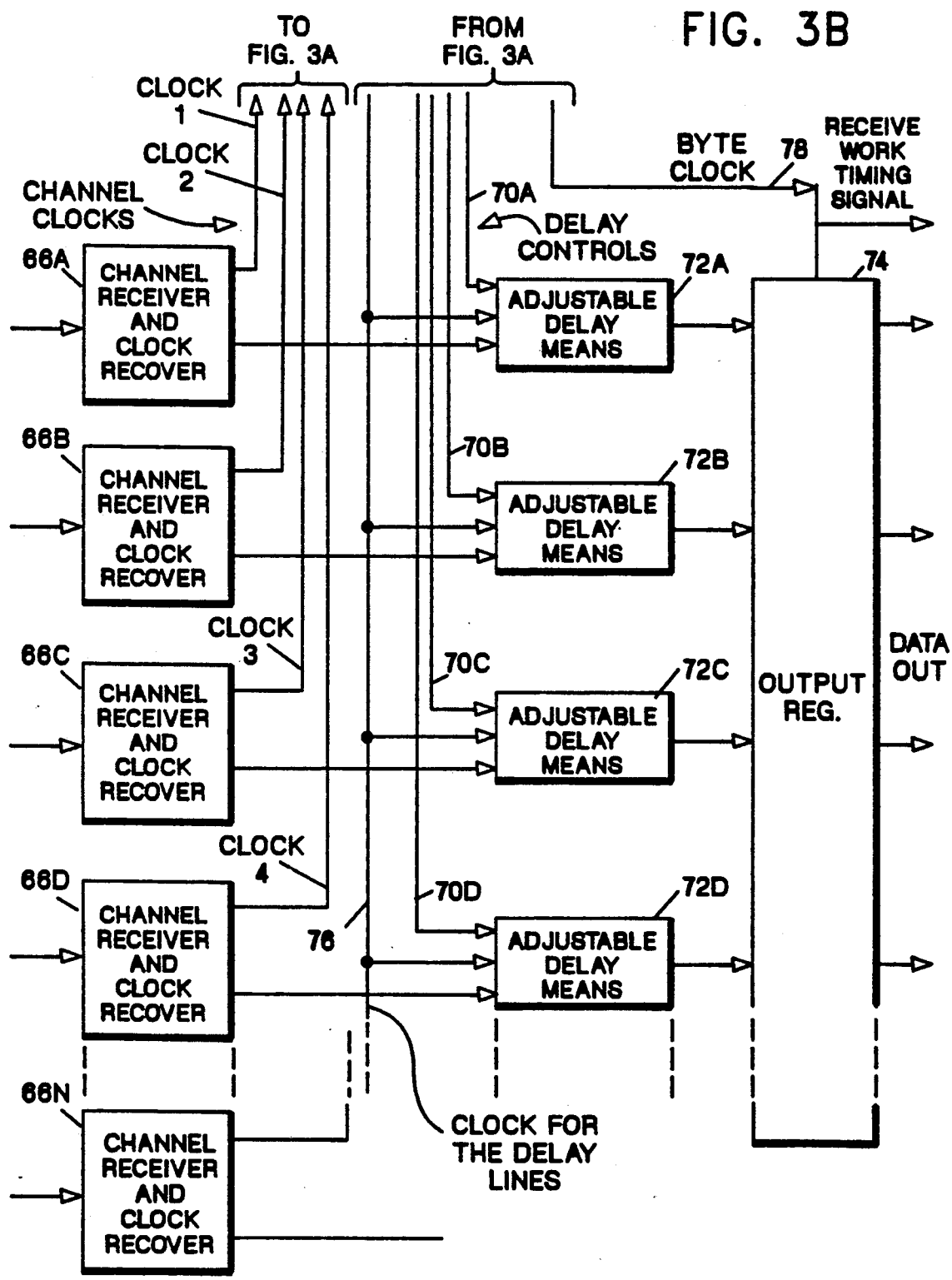
FIG. 3 is a block diagram of an apparatus used to implement the invention.

FIGS. 3A and 3B show a block diagram of the bit skew correction system 22 (FIG. 1). The individual bit signals in each of the bit channels of bus 20 (FIG. 1) are applied to channel receiver and clock recovery circuit means 66A through 66N. Such circuits are well known in the art and will not be described in detail. Suffice it to say that the channel receiver and clock recovery circuit set forth in the above referenced patent may be used in the present invention. Each of the channel recovery and clock recovery circuit means derives a bit or channel clock signals which are supplied to comparators 61, 63 and 65 via conductors labeled CLOCK 1, CLOCK 2, CLOCK 3 and CLOCK 4. In addition, each of the channel receiver and clock recovery circuits derives bit signals which are delivered to adjustable delay means 72A through 72D. The function of the adjustable delay means 72A through N is to delay the fastest bits in a transmitted byte to provide linear alignment between the bits. The output from the adjustable delay means are fed into the output register 74 from which the aligned data for each byte is delivered to utilization device 25 (FIG. 1).

Figure 5:
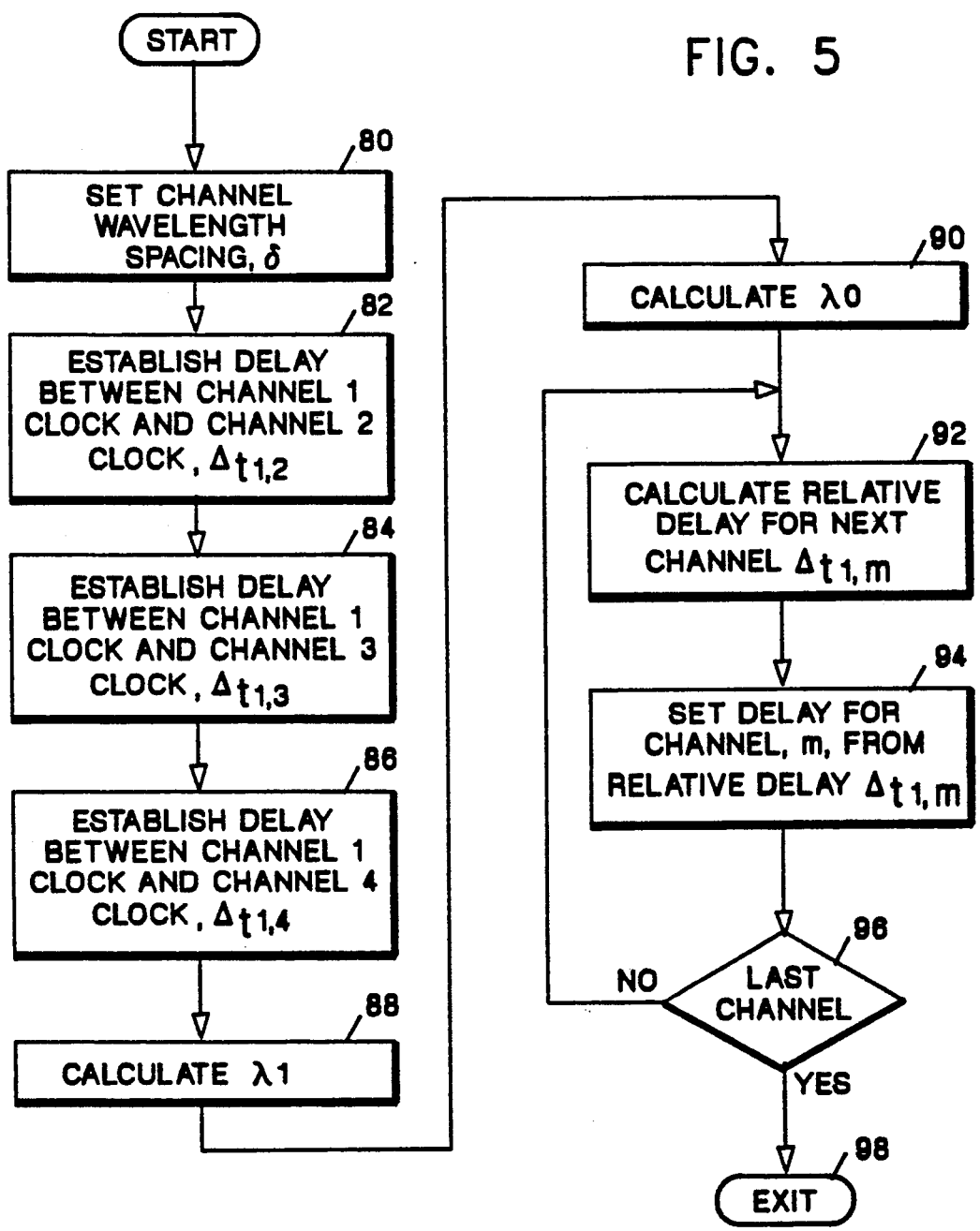
FIG. 5 is a flow chart of the algorithm which generates the respective channel delays.

Still referring to FIGS. 3A and 3B, the comparators 61, 63 and 65 compare the phase of the clock signals on channels 2, 3 and 4 with the phase of the clock signal on channel 1. With reference to FIG. 2, device 30A represents channel 1, device 30B represents channel 2 and so forth. Referring again to FIG. 3A, the output signal $\Delta t_{1,2}$ represents the delay between clock 1 and 2. Similarly, the delay signal $\Delta t_{1,3}$ is the delay between clock 1 and 3. Finally, $\Delta t_{1,4}$ is the delay between clock 1 and clock 4. The respective delays are fed into channel delay control means 67 which generates the byte clock signal on conductor 78, delay control signals 70A, 70B, 70C through 70N and a signal called clock for the delay lines. The clock signal is used to gate the adjustable delay means while the delay control signals set the adjustable delay means at a position that reflects the value of the calculated and measured delay. The channel delay control means 67 may be formed from hardware circuits generated from the flow chart set forth in FIG. 5 or the controller may be a computer pro- ...ned in accordance with the process steps set forth ...d flow chart.

In the preferred embodiment of the invention, a microcomputer program according to the flow chart is preferred. With reference to the flow chart, a value for the spacing δ between the laser element 24A through 24H is set 80. A value can be obtained from the manufacturers of the laser devices. The respective delays between selected clock signals are determined (82, 84, 86). In block 88 λ1 is calculated in accordance with equation B. Similarly, λ0 (block 90) is calculated in accordance with equation C. The relative delay $\Delta t_{1,m}$ for the next channel is calculated (92). In block 94, the calculated delays are used for setting the adjustable channel delay means 72A, 72B, 72C and 72D. From block 94, the program descends into block 96 where it tests to see if the delay for the last channel is calculated. If it is the last channel, the program descends into block 98 where it exits the program. If additional channels remain to be calculated, the program branches back to block 92 to repeat the calculation for that channel.

Figure 6:
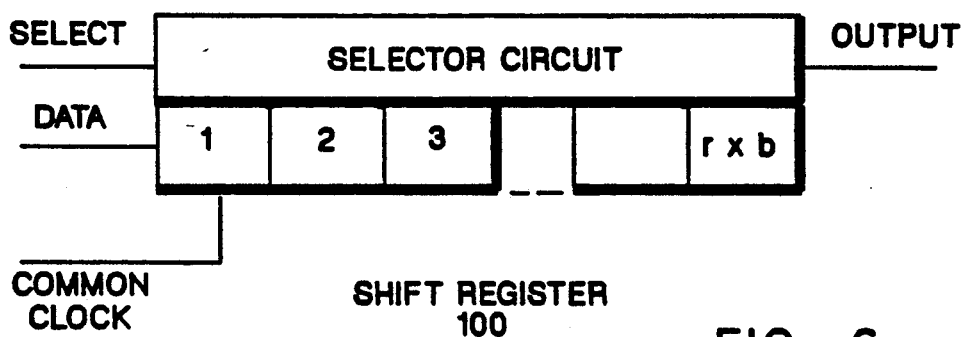
FIG. 6 shows a block diagram of a circuit arrangement for an adjustment delay.

FIG. 6 shows a block diagram of a circuit arrangement for the adjustable delay means. The adjustable delay means includes a selector circuit 102, shift register 100, a common clock line, a select line, a data line and an output line.

With reference to FIG. 3B, the output line is connected to register 74. The common clock line is connected to the line labeled Clock for the Delay lines. The data line is connected to the channel receiver and clock recovery circuit means and the select line is connected to one of the delay controls 70A-70D.

When the maximum delay expected in a link is less than one bit time, the variable delay is simply a one bit register which is gated on to sample the receiver output at $\Delta t_{1,m}$ after the channel one is gated into its register.

When more than a bit time delay is expected, the design must include storage such as a shift register 100. The algorithm must be expanded to make use of the fact that $\Delta t_{1,j}$ will be smaller than $\Delta t_{1,k}$ if and only if the delay of the $k_{th}$ bit clock beyond the $j_{th}$ bit clock is more than one bit time. Using this fact, each pair of bit clock delays can be examined, and one bit delay added to all those after the first inversion (smaller rather than larger) of successive bit clock delays. This procedure makes use of the fact that the group delay curve is monotonic on one side of the zero dispersion wavelength.

For many links, such complications are not required. But if they are, the variable delay can be realized in several ways. The easiest to visualize is a shift register b×r sections long. Where b is the maximum number of complete bit times of delay expected in the longest link, and is the desired sub-bit time delay resolution.

The variable delay also contains a selector circuit 102 such that one particular section of the shift register is coupled to the output, and thus to the output register (FIG. 3B).

The delay algorithm output to each individual adjustable delay means or variable delay means sets the selector so that the section of the shift register connected to the output register (FIG. 3B) corresponds to a delay of $\Delta t_{1,n} - \Delta t_{1,m}$ for channel m where $\Delta t_{1,n}$ is the calculated delay on the channel farthest from λ0. Thus, the longest delay is for channel 1 which is closest to λ0 and the shortest delay is for channel n which is farthest from λ0. Therefore, the variable delay added to the delay of information in a channel yields a total delay which is equal for all channels.

The algorithm was presented such that the delays $\Delta t_{1,m}$ were calculated since this simplifies the mathematics. If the variable delay illustrated here were used, the algorithm should convert these delays to $$\Delta t_{n,m} = \Delta t_{1,n} - \Delta t_{1,m}$$

for simplicity in setting the selector section of the delay. If other types of variable delay are used, this may not be necessary.

In the variable delay being described, the clock to the shift registers is r times faster than the channel bit clocks. Each register samples its channel receiver output and holds a pattern corresponding to the channel receiver output bits sampled every time periods for b bits. By connecting the proper sample time (register section) to the output register, the appropriate data bit is selected. It should be noted that other types of delay can be used without departing from the teachings of the present invention.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. A method for linearly aligning bits in a group that are converted into a plurality of parallel optical signals, transmitted through a plurality of optical channels to an optical multiplexer which combines the optical signals into a single multi-frequency optical signal which is transmitted through a dispersive medium to a receiving system that separates the single multi-frequency signal into a plurality of parallel single frequency optical signals which are converted into electrical signals and deliver to a utilization device, said method comprising the steps of:

(a) obtaining a value (δ) for a spacing between the optical signals;

(b) at the receiving system, determining a first set of relative delay values representative of differences in derived arrival times between selected ones of said optical signals in the group;

(c) determining a value (λ1) for a wavelength of a first selected one of the optical signals;

(d) determining a value (λ0) for the wavelength of zero dispersion of the medium;

(e) using values from steps (a), (c) and (d) calculate a second set of relative delay values for difference in arrival times between remaining optical signals in said group; and (f) delaying each one of said optical signals for a time period corresponding to the delay calculated for each signal.

2. The method set forth in claim 1, wherein the first set of relative delay values are generated by recovering a plurality of clock signals from a plurality of the optical signals;

(ii) selecting one of said clock signals as a reference clock; and (iii) comparing the reference with other ones of said clock signals.

3. The method of claim 2 wherein the group includes m data bits, with bits one through four selected to provide the plurality of clock signals and a clock signal recovered from bit one being the reference clock.

4. The method of claim 3 wherein the first value for the wavelength of the first selected one of the optical signal being $$\lambda_1 = \frac{-b \pm \sqrt{B^2 - 4ac}}{2a}$$

where $\lambda_1$ represents the wavelength of bit one;
$a = 2(3\Delta t_{1,3} - \Delta t_{1,4} - 3\Delta t_{1,2})$
$b = 4\delta(-4\Delta t_{1,3} + \Delta t_{1,4} + 5\Delta t_{1,2})$
$c = \delta^2(39\Delta t_{1,3} - 7\Delta t_{1,4} - 57\Delta t_{1,2})$
where $\Delta t_{1,2}$ represents relative delay between bits one and two;
$\Delta t_{1,3}$ represents relative delay between bits one and three;
$\Delta t_{1,4}$ represents relative delay between bits one and four
$\delta$ represents the spacing between the wavelengths.

5. The method of claim 4 wherein the zero dispersion wavelength of the medium is calculated from:

$$\lambda_0 = \frac{\delta\left(\frac{\Delta t_{1,3}}{\Delta t_{1,2}} - 2\right)}{\frac{\Delta t_{1,3}}{\Delta t_{1,2}}\ln\left(1 + \frac{\delta}{\lambda_1}\right) - \ln\left(1 - \frac{2\delta}{\lambda_1}\right)}$$

6. The method of claim 5 wherein the time delays for selected signals are calculated from:

$$\Delta t_{1,m} = \frac{(m-1)\delta - \lambda_0\ln\left(1 + \frac{(m-1)\delta}{\lambda_1}\right)}{\delta - \lambda_0\ln\left(1 + \frac{\delta}{\lambda_1}\right)}\Delta t_{1,2}$$

where $\lambda_0$ represents the dispersion wavelength of the medium.

7. A method for deskewing the bits in a byte of data transmitted from a source system in parallel bit channels using frequency division multiplexing through a dispersive medium, said method comprising the steps of:
detecting at a deskewing location the arrival of bits in each of parallel bit channels;
determining a set of relative delays between derived bit clocks in selected ones of the bit channels;
determining the spacing between the parallel bit channels at said source system;
determining wavelengths for detected bits in selected ones of the bit channels; and
establishing the relative times of arrival for bits in the remaining bit channels as a function of the set of relative delays, the spacing between the parallel channels and the wavelengths.

8. The method of claim 7 further including the steps of:
delaying bits in each of the parallel channels an amount of time corresponding to the delay for that channel.

9. A system for deskewing the bits in a byte of data transmitted from a source system in parallel bit channels using frequency division multiplexing through a dispersive medium, said system comprising:
means positioned at a deskewing location, for detecting the arrival of bits in each of the parallel bit channels;
means positioned at the deskewing location, for determining a set of relative delays between derived bit clocks in selected ones of the bit channel;
means for detecting a wavelength for detected bits in at least a selected one of the bit channel;
means for determining a zero dispersion wavelength for the dispersive medium interconnecting the source system to a sink system; and
means for establishing the relative times of arrival for bits in the remaining bit channels as a function of the set of relative delays, spacing between the parallel channels and the zero dispersion wavelength for the medium.

10. The system of claim 9 further including delay means coupled to each of the channels for delaying bits an amount of time corresponding to the delay for that channel.

11. The system of claim 10 wherein the delay means includes a shift register and a selector circuit means coupled to said shift register.

12. A method for linearly aligning data bits transmitted through an optical communications network comprising the steps of:
(a) calculating a first wavelength value ($\lambda_1$) for bits traveling through a selected channel of the optical communications network;
(b) calculating a second wavelength value ($\lambda_0$) representative of a dispersive wavelength of the medium; and
(c) correlating the first wavelength value and the second wavelength value to predict relative delays between the data bits of a selected group of bits.

13. An apparatus for linearly aligning data bits transmitted through an optical communications network comprising:
a means, at a receiving node, for calculating a first wavelength value ($\lambda_1$) representative of bits transmitted through a selected optical channel of the optical communications network;
a means, at the receiving node, for calculating a second wavelength value ($\lambda_0$) representative of a dispersive wavelength of the medium; and
means for correlating the first wavelength value and the second wavelength value to predict relative delays between the data bits of a selected group of bits.

* * * * *